Patented July 20, 1954

2,684,336

UNITED STATES PATENT OFFICE 2,684,336

SILICONE LUBRICANT CONTAINING TRIALKYL PHOSPHATE

Douglas H. Moreton, Pacific Palisades, Calif., assignor to Douglas Aircraft Company, Inc., Santa Monica, Calif.

No Drawing. Application June 2, 1950, Serial No. 165,868

10 Claims. (Cl. 252—49.9)

This invention relates to a silicone oil or liquid having improved properties as a lubricant.

Silicone oils or fluids are synthetic relatively high molecular weight liquids, the molecules of which have a skeleton structure of alternating silicon and oxygen atoms bonded one to another with hydrocarbon groups attached to silicon atoms. Silicone oils or fluids may also be regarded as the liquid silicone polymers or polymeric organosiloxanes. These silicone oils or fluids are known and are amply described in the literature, particularly in the following publications: Chemistry of the Silicones, by Eugene G. Rochow, published by John Wiley & Sons, Inc., particularly chapter 4, methyl silicone oil is described on pages 64 to 70; Silicone oils, part I: Their properties, General Electric Review, November 1946, vol. 49, No. 11, pages 14-18, part II: Their applications, General Electric Review, December 1946, vol. 49, No. 12, pages 28-33, both articles by Dr. Donald F. Wilcock; Silicone lubricants, by T. A. Kauppi and W. W. Pederson, Lubrication Engineering, December 1946, vol. 2, No. 4, page 158, and February-March 1947, vol. 3, No. 1, page 17; Dimethyl-silicone-polymer fluids and their performance characteristics in hydraulic systems, by V. G. Fitzsimmons, D. L. Pickett, R. O. Militz, and W. A. Zisman, in Transactions of the A. S. M. E. for May 1946, page 361: Dimethyl-silicone-polymer fluids and their performance characteristics in unilaterally loaded journal bearings, by J. E. Brophy, R. O. Militz, and W. A. Zisman, in Transactions of the A. S. M. E. for May 1946, page 355, and in references cited therein.

It is well known that such silicone oils or liquid silicone polymers have many properties which make them exceedingly desirable as lubricants. These properties particularly include the relatively small change in viscosity with temperature, especially over a wide range of temperature, high chemical stability even at relatively high temperatures, chemical inertness and unreactivity, low pour point, resistance to shear breakdown, low vapor pressure (especially with volatile fractions removed), high resistance to combustion, inertness toward available natural and synthetic rubbers, and, where the oil contains branched chain molecules by introducing trifunctional groups into the composition before equilibration, the oils have both very low pour points and high reluctance to crystallize or solidify, giving them very desirable low temperature properties. However, it is also known that silicone fluids are lacking in lubricating properties, particularly with respect to extreme pressure and load-carrying capacity, so that in applications involving high rubbing speeds or high unit bearing pressures the results are undesirable. In fact, some silicone oils fail as satisfactory lubricants at pressures somewhat lower than those ordinarily considered to be the initial stages of the extreme pressure range. Such lack of lubricity or oiliness of the silicone fluids, particularly the dimethyl silicone polymer fluids, is especially noticeable where both the loaded surfaces are ferrous, such as steel on steel and steel on cast iron.

The situation described in the preceding paragraph is particularly true with regard to the liquid organo-substituted polysiloxanes containing an average of about 1.9 to 2.5 aliphatic groups per silicon atom as more particularly described in United States Patent No. 2,471,850. The physical properties of such liquid organo-substituted polysiloxanes make them a very desirable liquid for lubrication under hydrodynamic or fluid film conditions. Many of these liquid aliphatic-substituted polysiloxanes have low viscosity temperature coefficients, low pour points, and good resistance to oxidation up to temperatures as high as 175° C. However, such materials when employed for lubricating purposes, under certain lubricating conditions where a fluid film has not been formed or has been broken down, may not afford the protection against seizure that has come to be expected from petroleum-base oils of like viscosity. This disparity in boundary lubrication properties is particularly pronounced where both rubbing surfaces are steel and may not be quite as pronounced where one of the rubbing surfaces is a non-ferrous material such as bronze. Such liquid aliphatic-substituted polysiloxanes are compositions comprising essentially silicon atoms connected to one another by oxygen atoms as illustrated by the following structure called a siloxane structure

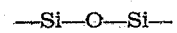

wherein a preponderant number of the valences of the silicon atoms are satisfied by the substitution thereon of organic radicals, e. g., aliphatic radicals. These compositions of matter may be prepared, for example, by the hydrolysis of hydrolyzable aliphatic-substituted silanes, e. g., dialiphatic-substituted dihalogenosilanes, for instance, dimethyl dichlorosilane, followed by complete or partial condensation of the hydrolysis product. They may also be prepared by hydrolyzing mixtures of hydrolyzable dialiphatic-substituted silanes either among themselves or with hydrolyzable silanes containing, for example, three aliphatic radicals substituted on the silicon atom, for instance, trimethyl chlorosilane. More specific directions for the hydrolysis of hydrolyzable aliphatic-substituted silanes to form liquid aliphatic-substituted polysiloxanes may be found, e. g., as indicated in Patent No. 2,471,850, in Patnode applications, Serial Nos. 463,813 (abandoned), 463,814 (Patent No. 2,469,888) and 463,815 (abandoned), filed October 29, 1942, and in Wilcock application, Serial No. 655,162 (pending), filed March 21, 1946. Liquid aliphatic-substituted polysiloxanes containing an average of about 1.9 to less than 2.0 aliphatic groups per silicon atom may be prepared, for example, by hydrolyzing a mixture of aliphatic-substituted chlorosilanes containing an average of about 1.9 to less than 2.0 aliphatic groups per silicon atom.

By the term "hydrolyzable aliphatic-substituted silanes" is intended to mean derivatives of $SiH_4$ which contain hydrolyzable groups or radicals, e. g. halogens, amino groups, alkoxy, aryloxy, and acyloxy radicals, etc., in addition to the aliphatic groups substituted directly on the silicon atom that are joined to the silicon through carbon-silicon linkages. Examples of such aliphatic radicals (including alkyl radicals) are, e. g., methyl, ethyl, propyl, butyl, etc.; alicyclic radicals e. g., cyclopentyl, cyclohexyl, etc.; alkenyl radicals, e. g., vinyl, allyl, methallyl, etc. If desired, the above-mentioned radicals may also contain substituents substituted thereon, for instance, halogens.

Hydrolysis of the above silanes or mixtures of the silanes results in the formation of silanols, i. e., aliphatic-substituted silanes containing hydroxy groups substituted directly on the silicon, which hydroxy groups almost immediately condense intermolecularly (intercondense) splitting out water to give the siloxane linkages mentioned previously. Such intercondensations are accelerated by acidic materials, e. g., sulfuric acid, hydrochloric acid, ferric chloride, etc., as well as by the basic materials, e. g., sodium hydroxide, ammonium hydroxide, etc. As a result of the hydrolysis and condensation, aliphatic-substituted polysiloxanes may be produced which are partially or completely condensed and which may have on the average up to as high as three organic radicals substituted per silicon atom. The liquid aliphatic-substituted polysiloxanes prepared in this manner consist essentially of silicon atoms joined together by oxygen atoms through silicon-oxygen linkages and aliphatic radicals attached to silicon through carbon-silicon linkages, the remaining valences, if any, of the silicon atoms being satisfied by hydroxyl radicals and/or by residual unhydrolyzed radicals such as the hydrolyzable radicals listed previously.

It has now been discovered, in accordance with my invention, that lubricating properties of such silicone polymer fluids can be substantially improved by the incorporation therewith of a suitable tri-alkyl phosphate. This was quite surprising and unexpected since many of the additives incorporated in petroleum base lubricants for improving the lubricating properties thereof are either insoluble in the silicone fluid or ineffective for the particular purpose added.

The following examples will illustrate my invention:

EXAMPLE 1

A composition in accordance with my invention was made up as follows:

90% by volume dimethyl silicone polymer (9981-LT-NV-70)
10% by volume tri(2-ethyl hexyl) phosphate The tri-octyl phosphate was incorporated into the dimethyl silicone polymer by dissolving the tri-octyl phosphate therein. This was accomplished simply by mixing the two components at room temperature. A significant feature of this invention is the discovery that this tri-octyl phosphate can be dissolved in the silicone polymer fluid.

Both the particular silicone polymer and the composition containing the tri-octyl phosphate were tested for extreme pressure properties on a Shell 4-ball extreme pressure tester, steel-on-steel. The dimethyl silicone polymer alone was found to have a seizure load at 10 seconds of only 126 kilograms, whereas the composition containing the organic phosphate incorporated therein had a seizure load at 10 seconds of 180 kilograms, a surprising increase of over 40 per cent. It will be observed that the incorporation of the tri-octyl phosphate had the effect of raising the seizure load from the unsatisfactory value of 126 kilograms to the satisfactory level of 180 kilograms, thus imparting to the silicone oil desirable extreme pressure properties.

The foregoing improvement in lubricating properties of the silicone oil also renders it suitable for use as a relatively non-flammable hydraulic fluid, especially where such lubricating properties are necessary or desirable, and the following tests were made to show the desirable properties for such use:

Autogenous ignition temperature (A. S.
  T. M. D286-30) _____° F__ 800
Viscosity at—
  210° F_____centistokes__ 22.0
  100° F_____do____ 58.4
  −30° F_____do____ 492

The dimethyl silicone polymer of methyl silicone oil used in this Example 1 was obtained from the General Electric Company, Schenectady, New York, under its trade designation 9981LT-NV-70. It is a methylpolysiloxane liquid containing linear methylpolysiloxanes having molecules of finite length. This and similar silicone oils are described in the trade publication of the General Electric Company, Resin and Insulation Materials Division—Chemical Department, Schenectady, N. Y., entitled "A Comparative Study of G-E Silicone Oils and Petroleum Oils in Hydraulic Applications" and supplemental sheet entitled "Available G-E Silicone Oils." The letters "LT" indicate a silicone oil having extremely low temperature properties. Such a silicone oil is particularly referred to on the third page of the article "Silicone oils, part I: Their properties," by Dr. Donald F. Wilcock, General Electric Review, November 1946, in the second paragraph under the heading "Physical properties" and in the articles by D. F. Wilcock in The Journal of the American Chemical Society, vol. 68, 1946. The letters "NV" indicate that volatiles have been removed, particularly the small molecules, by vacuum distillation as a step in their manufacture. The numeral "70" indicates the viscosity in centistokes at 100° F. This dimethyl silicone polymer, 9981LTNV-70, had the following properties:

Autogenous ignition temperature (A. S.
  T. M. D286-30) _____° F__ 810
Viscosity at—
  210° F_____centistokes__ 27.8
  100° F_____do____ 72.7
  −30° F_____do____ 510

The tri-octyl phosphate was one in which the octyl groups were iso-octyl and specifically 2-ethyl hexyl. This tri(2-ethyl hexyl) phosphate was found to have the following properties:

| | |
|---|---|
| Autogenous ignition temperature (A. S. T. M. D286–30). | Below 550° F. Too low where non-flammability is required. |
| Viscosity at— | |
| 210° F | 2.29 centistokes. |
| 100 | 6.4 centistokes. |
| Viscosity index | 90. |
| Viscosity at −40° F | 787 centistokes. |

Examples 2 to 7 show other compositions made in accordance with my invention using different proportions of the dimethyl silicone polymer and tri-octyl phosphate of Example 1. These Examples 2 to 7 are shown along with Example 1, the dimethyl silicone polymer alone and the tri-(2-ethyl hexyl) phosphate alone in Table I below:

*Table I*

| | Ex. 1 | Ex. 2 | Ex. 3 | Ex. 4 | Ex. 5 | Ex. 6 | Ex. 7 | |
|---|---|---|---|---|---|---|---|---|
| Percent Dimethyl Silicone Polymer | 100 | 90 | 80 | 70 | 50 | 30 | 20 | 10 | 0 |
| Percent Phosphate | 0 | 10 | 20 | 30 | 50 | 70 | 80 | 90 | 100 |
| A. I. T. ° F | 810 | 800 | 740 | 740 | 730 | 750 | 750 | 750 | |
| Viscosity (cs.): | | | | | | | | | |
| 210° F | 27.8 | 22.0 | 17.7 | 14.2 | 9.09 | 5.46 | 4.09 | 3.09 | 2.29 |
| 100° F | 72.7 | 58.4 | 47.9 | 39.7 | 27.3 | 17.2 | 13.6 | 10.7 | 8.4 |
| −30° F | 510 | 492 | 496 | 485 | | | 552 | 515 | |
| −40° F | | | | | | | | | 787 |

Examples 8, 9 and 10 were made from a dimethyl silicone polymer from a different source. These examples and their properties are shown in Table II below:

*Table II*

| | Ex. 8 | Ex. 9 | Ex. 10 | | |
|---|---|---|---|---|---|
| Percent Dimethyl Silicone Polymer (DC500–70) | 100 | 70 | 50 | 30 | 0 |
| Percent Tri(2-ethyl hexyl) Phosphate | 0 | 30 | 50 | 70 | 100 |
| A. I. T. ° F | | 690 | 700 | 770 | |
| Viscosity (cs.): | | | | | |
| 210° F | | 16.2 | 9.66 | 5.65 | 2.29 |
| 100° F | | 40.6 | 28.1 | 17.8 | 8.4 |
| −30° F | | 421 | | | |
| −40° F | | | | | 787 |

The dimethyl silicone polymer oil in these examples was obtained from the Dow Corning Corporation, Midland, Michigan, and this dimethyl silicone polymer and similar polymers are described in the trade publications of the Dow Corning Corporation, entitled "Dow Corning Fluids" and "DC Dow Corning Silicones."

Although the dimethyl silicone polymer fluids in the examples above have a viscosity of 70 centistokes at 100° F., the advantages of my invention may be obtained on any silicone oil, particularly the dimethyl silicone polymer, with different viscosity characteristics. For example, for use as a relatively non-flammable hydraulic fluid for aircraft, having a pump such as the Vickers pump in the hydraulic system, such a dimethyl silicone polymer having a viscosity of about 20 centistokes at 100° F. will be found more suitable in the compositions of my invention. The advantages of my invention may be obtained for any use to which the silicone oil may be put. Moreover, the advantages of my invention may be obtained regardless of the form in which the silicone oil is used as a lubricant, for example, in accordance with my invention, the suitable organic phosphate may be incorporated into the silicone oil used in a grease.

In order to illustrate the effectiveness of my invention for silicone oils having a wide range of viscosity the following Examples 11 and 12 were made:

EXAMPLE 11

90% by volume dimethyl silicone polymer (9981–LT–NV–20)
10% by volume tri(2-ethyl hexyl) phosphate The surprising result was obtained that this tri-octyl phosphate was soluble in the dimethyl silicone polymer at room temperature. The composition had no cloud, and the pour point was below −90° F. The dimethyl silicone polymer used was the same type as that described for Example 1 above except that it was a lighter silicone polymer having a viscosity of only 20 centistokes at 100° F.

EXAMPLE 12

90% dimethyl silicone polymer (DC–200–1000)
10% tri(2-ethyl hexyl) phosphate

Even in this highly viscous dimethyl silicone polymer, the surprising result of solubility of this tri-octyl phosphate was found at room temperature. This composition was also found to have no cloud, and a pour point of below −90° F. The dimethyl silicone polymer DC–200–1000 was a member of the Dow Corning Type 200 which is a series of liquid silicones of the homologous series of pure trimethyl end-blocked dimethyl siloxanes ranging in viscosities at 25° C. from 0.65 to 12,500 centistokes. The 0.65- and 2.0-centistokes liquid silicones are essentially pure compounds, hexamethyldisiloxane and dodecamethylpentasiloxane, respectively; all the others are mixtures of silicone polymers. These polymers are more particularly described in the article entitled "Thermal conductivity of liquid silicones," by O. Kenneth Bates, Industrial and Engineering Chemistry, vol. 41, page 1966, September 1949. In the designation "DC–200–1000," "DC–200" indicates the Dow Corning Type 200 liquid silicone polymer, and the subsequent number, such as 1000 in Example 12 above, indicates the viscosity in centistokes at 25° C. The DC-200 fluids are also described in the trade publications of the Dow Corning Corporation, entitled "Dow Corning Fluids" and "DC Dow Corning Silicones."

The Dow Corning Silicones Type 200 are also more particularly referred to in the trade publication of the Dow Corning Corporation, Midland, Michigan, entitled "Dow Corning Silicone Note Book, Fluid Series No. 3" issued September 1948. This booklet describes the liquid methyl silicones known in the trade as DC–200 fluids. They are a continuous series of linear polymers having the same chemical structure and the same general properties and may vary in viscosity from 0.65 to 1,000,000 centistokes at about 25° C. The properties approach a practically constant value as the polymer size or viscosity approaches 100 centistokes, and for this reason the lower members were originally grouped together and distinguished by the designation DC-500, but this distinguishing designation has been abandoned in the trade and all such fluids are known as DC-200 fluids. Hence, DC-500-70 fluid used in Examples 8, 9 and 10 above is the same as a DC-200-70 fluid and is now known as DC-200-70 fluid. Also as pointed out in this booklet, the properties of these silicone polymers is due to their chemical structure. The chemical bonds which are most important in such silicones are the silicon-oxygen and silicon-carbon bonds. The simplest silicone may be made from silicon tetrachloride by replacing two chlorine atoms with methyl groups and the resulting product hydrolyzed with water to produce a dimethyl siloxane unit which may be represented by the formula

The polydimethyl siloxanes such as the DC-200 fluids are made up of a chain of such units and these polydimethylsiloxanes or DC-200 fluids are made up of chains of varying length as represented by the formula:

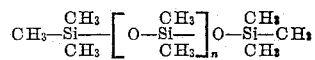

These polydimethylsiloxanes are liquid at room temperature even though $n$ may vary from 0 to 2,000 or more. The viscosity of the liquid depends on the average length of the polydimethyl siloxane chain. These polydimethylsiloxanes have chains in which $n$ in the formula above may be from 2 to over 2,000. Viscosities at room temperature of about 25° C. may vary from 0.65 centistoke to 1,000.

EXAMPLE 13

9% by volume dimethyl silicone polymer (9981-LT-NV-20)
10% by volume tri(normal-butyl) phosphate The tri(normal-butyl) phosphate dissolved in this dimethyl silicone polymer at room temperature. No cloud was found and the pour point was below —90° F.

EXAMPLE 14

90% by volume dimethyl silicone polymer (DC-200-1000)
10% by volume tri(normal-butyl) phosphate The tri(normal-butyl) phosphate also dissolved in this viscous dimethyl silicone polymer at room temperature. The resulting composition had a cloud point of —10° F. and froze at —80 to —85° F.

The foregoing examples illustrate my invention with respect to a dimethyl silicone polymer or polymethylsiloxane in which the surprising discovery has been made that certain trialkyl phosphates are soluble in the silicone oil and are effective to improve lubricating properties thereof, particularly, to improve the anti-seize property, especially for steel-on-steel. As pointed out above this is quite surprising since most of the additives used for petroleum base lubricants are either insoluble in the silicone oil or ineffective for the purpose added. For example, tri-cresyl phosphate commonly used for petroleum lubricating oils, will not dissolve in the dimethyl silicone polymers or polymethylsiloxanes.

Although the examples above illustrate the use of tri(normal-butyl) phosphate and a particular tri-octyl phopshate, any of the tri-alkyl phosphates in which the alkyl groups have from about 3 to 10 carbon atoms may be used. For the heavier polymethylsiloxanes the higher carbon atoms per alkyl group are preferred, as is illustrated by Examples 12 and 14 where a lower pour point is obtained with the tri-octyl phosphate than with the tri-butyl phosphate.

Moreover, although my invention as illustrated in the foregoing example relates particularly to the dimethyl silicone oil, and is particularly suitable for the liquid methyl polysiloxane containing an average of from about 1.9 to 2.5 methyl groups per silicon atom, especially for from about 2.0 to 2.2, it applies also to other silicone oils including other liquid aliphatic-substituted polysiloxanes, for instance, liquid alkyl-substituted polysiloxanes, for example, liquid ethyl-, propyl-, butyl-, isopropyl-substituted polysiloxanes, etc.

Although useful compositions result either with a sufficient proportion of the phosphate in the methyl silicone oil to increase the lubricating properties and with a sufficient proportion of the silicone oil in the phosphate to improve low temperature properties or fire-resistance of the tri-octyl phosphate, or both, the preferred proportions range from sufficient phosphate to increase the lubricating properties to about 70 volume per cent of the phosphate, particularly as a non-flammable fluid for the hydraulic systems of aircraft.

This application is a continuation-in-part of my co-pending application Serial No. 23,147, filed April 24, 1948, now abandoned.

I claim:

1. The liquid lubricating composition consisting essentially of a liquid dimethyl silicone polymer lubricant and a sufficient proportion of tri-alkyl phosphate in which the alkyl groups have from about 3 to 10 carbon atoms per alkyl group to increase the anti-seize lubricating property of said composition over that of said dimethyl silicone polymer.

2. The liquid lubricating composition consisting essentially of a liquid aliphatic-substituted polysiloxane lubricant containing an average of from about 1.9 to 2.5 aliphatic groups per silicon atom, and a sufficient proportion of trialkyl phosphate having from 3 to 10 carbon atoms per alkyl group to increase the anti-seize lubricating property of said composition over that of said polysiloxane lubricant.

3. The liquid lubricating composition consisting essentially of a liquid methyl polysiloxane lubricant containing an average of from about 1.9 to 2.5 methyl groups per silicon atom, and trialkyl phosphate having from 3 to 10 carbon atoms per alkyl group to increase the anti-seize lubricating property of said composition over that of said polysiloxane lubricant.

4. The composition as defined in claim 3 in which said tri-alkyl phosphate is tri(2-ethyl hexyl) phosphate.

5. The composition as defined in claim 3 in which said tri-alkyl phosphate is tri(normal-butyl) phosphate.

6. The liquid lubricating composition having satisfactory anti-seize lubricating properties consisting essentially of a liquid dimethyl silicone polymer lubricant deficient in anti-seize properties containing a sufficient proportion of a tri-alkyl phosphate with alkyl groups of 3 to 10 carbon atoms dissolved in said liquid dimethyl silicone polymer lubricant to improve the anti-seize properties of said composition over that of said dimethyl silicone polymer lubricant.

7. The composition as defined in claim 6 in which said phosphate is tri(2-ethyl hexyl) phosphate.

8. The composition as defined in claim 6 in which said phosphate is tri(normal-butyl) phosphate.

9. The normally liquid homogeneous lubricating composition consisting essentially of a liquid aliphatic-substituted silicone polymer lubricant having a sufficient proportion of a trialkyl phosphate with alkyl groups of from 3 to 10 carbon atoms dissolved in said silicone polymer to increase the anti-seize lubricating property of said composition over that of said silicone polymer lubricant.

10. The liquid lubricating composition consisting essentially of about 90 percent of liquid dimethyl silicone polymer lubricant having a viscosity of about 70 centistokes at 100° F. and about 10 percent of tri(2-ethyl hexyl) phosphate.

References Cited in the file of this patent

UNITED STATES PATENTS

| Number | Name | Date |
| --- | --- | --- |
| 2,340,331 | Knutson | Feb. 1, 1944 |
| 2,435,124 | Bollinger | Jan. 27, 1948 |
| 2,442,741 | Morgan et al. | June 1, 1948 |
| 2,618,600 | Moreton | July 15, 1948 |
| 2,456,642 | Merker | Dec. 21, 1948 |
| 2,486,493 | Revukas | Nov. 1, 1949 |
| 2,528,535 | Merker | Nov. 7, 1950 |